Figure 1:
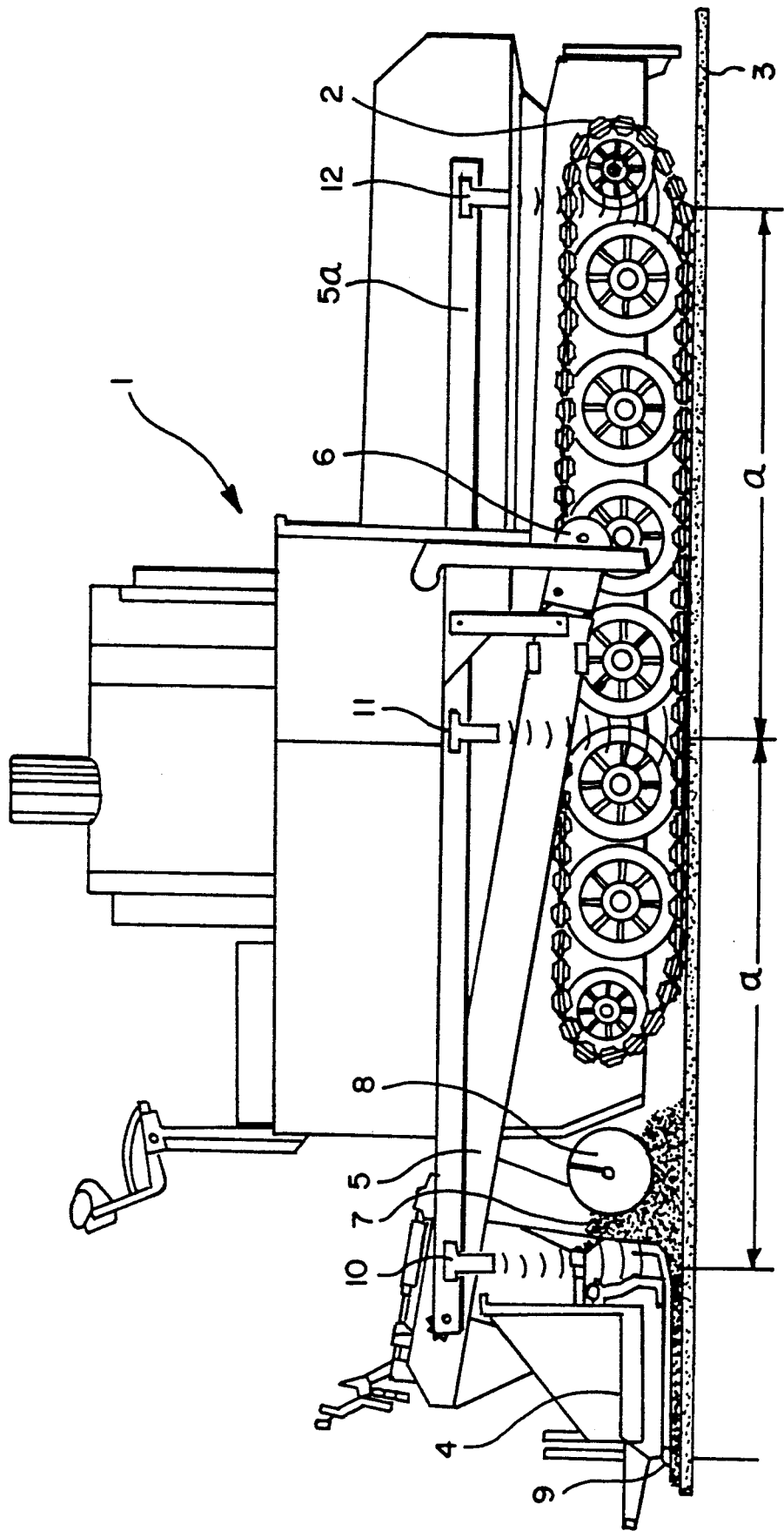

United States Patent [19]

Sehr et al.

[11] Patent Number: 5,258,961
[45] Date of Patent: Nov. 2, 1993

[54] ULTRASONIC SENSOR CONTROL UNIT FOR A ROAD FINISHING MACHINE

[75] Inventors: Willibald Sehr, Hadamar/Steinbach; Martin Zarniko, Diez, both of Fed. Rep. of Germany

[73] Assignee: MOBA-electronic Gesellschaft fur Mobil-Automation mbH, Elz, Fed. Rep. of Germany

[21] Appl. No.: 975,710

[22] Filed: Nov. 13, 1992

[30] Foreign Application Priority Data

Nov. 15, 1991 [DE] Fed. Rep. of Germany ... 9114281[U]

[51] Int. Cl.⁵ .............................................. G01S 15/00
[52] U.S. Cl. ...................................... 367/96; 404/84.5
[58] Field of Search ................... 367/95, 96, 124, 126, 367/13; 404/110, 84.5; 364/167.01, 474.34; 172/4.5

[56] References Cited

U.S. PATENT DOCUMENTS

| | | | |
|---|---|---|---|
| 4,722,547 | 2/1988 | Kishi et al. | 280/707 |
| 4,924,374 | 5/1990 | Middleton et al. | 367/127 |
| 4,961,173 | 10/1990 | Sehr et al. | 367/96 |
| 5,009,546 | 4/1991 | Domenighetti et al. | 404/110 |

FOREIGN PATENT DOCUMENTS 3816198 9/1989 Fed. Rep. of Germany .
2123952 2/1984 United Kingdom .

Primary Examiner—Daniel T. Pihulic
Attorney, Agent, or Firm—Ralph H. Dougherty

[57] ABSTRACT

An ultrasonic sensor control unit for a road finishing machine for generating a height control signal for a vertically adjustable beam, the ultrasonic sensor control unit including at least three ultrasonic sensors which are arranged at a considerable distance from the beam in the direction of motion of the road finishing machine. The ultrasonic sensor signals determine the distances between each ultrasonic sensor and a reference surface, the values which lie more than a predetermined distance outside of a plane which is determined by the measuring points associated with the other distances being rejected as faulty measurement. On the basis of the height signals, the mutual distances of the sensors, and the distance between a sensor and the rear edge of the beam, the evaluation means calculates the projected height at the rear edge of the beam. This height is compared with a selectable desired thickness value. The evaluation means controls the tie points of the beam so that an adequate layer thickness will be created.

6 Claims, 2 Drawing Sheets

ULTRASONIC SENSOR CONTROL UNIT FOR A ROAD FINISHING MACHINE

DESCRIPTION

The present invention relates to an ultrasonic sensor control unit for a road finishing machine for adjusting the height of a vertically adjustable screed whose rear edge defines the position of the upper surface of an applied but still uncompacted road surfacing.

Normally, a road finishing machine runs via a track-type travelling gear on a ground, which has been subjected to a preparatory treatment and onto which a pavement or a road surfacing is to be applied. A vertically adjustable screed is attached to the rear end of the road finishing machine. In front of the beam, a supply of surfacing material is heaped up, the supply being conveyed and distributed by a conveyor means, which guarantees that the amount of surfacing material kept in stock in front of the screed is always sufficient for complete and even spreading, but not exceedingly large. The height of the rear edge of the screed relative to the surface of the ground, which has been subjected to a preparatory treatment and which, if desired, can also consist of an old road surfacing, determines the thickness of the road surfacing produced, before the road surfacing is subsequently subjected to further compacting by rolling. The screed is held on a tie arm, which is supported such that it is adapted to be rotated about a tie point arranged in the central area of the road finishing machine, the height of the screed being determined by an hydraulic adjustment means.

In known road finishing machines, the height of the screed, which determines the thickness of the road surfacing to be produced, is controlled by a mechanical tracer device guided at the side of the road finishing machine along a reference surface. The height of the screed readjusted in accordance with the height of the tracer ski as determined by an evaluation means.

The reference plane along which the tracer ski is guided depends on the current working phase. Typically, the operating width of a road finishing machine will be less than the width of the road surfacing to be produced. For determining the height level of the road surfacing to be produced, a tight steel rope is normally used as a reference height for a first lane of the whole road surfacing which is to be produced. Upon applying the second lane, which should abut on the first lane without any difference in height, the tracer ski is guided over the first lane, which has just been produced and which now defines the reference plane. It follows that, making use of a tracer ski, different objects, such as the tight reference rope or the surfacing lane which has just been produced, can be used as a reference plane for known road finishing machines.

However, this known type of height control of the beam involves some system-dependent disadvantages, which previously have been regarded as being unsurmountable. If, for example, a surfacing lane which has already been produced is used as a reference plane for guiding the tracer ski upon producing the second lane and if the first lane has a certain, undesirable waviness, the second lane also will inevitably be constructed with faults, which will correspond in shape to the faults of the road surfacing in the area sampled by the tracer ski.

The mechanical sampling by means of the tracer ski is, necessarily, carried out in a type of envelope curve over the respective highest points of the reference surface. If, for example, an undesirable obstacle, e.g., in the form of a stone, lies on the reference surface, the undesirable deflection of the tracer ski, which will be effected by these points of interference, will cause a corresponding fault in the height of the surfacing lane produced. An additional problem will be caused by the mechanical sensitivity of the tracer ski, which, on the one hand, may be damaged easily, if operated by negligent operators, and which, on the other hand, wears rapidly even under normal operating conditions.

Applicants' U.S. Pat. No. 4,961,173 discloses a control sensor for a construction machine used for producing height control signals and direction control signals by sampling a reference rope or guide rope. The known control sensor is provided with a plurality of ultrasonic transceivers, which are arranged transversely to the direction of movement of the construction machine and which are arranged in a closely spaced, juxtaposed relationship of such a nature that their radiation cones will overlap in the measurement plane in which the guide rope or the reference rope is positioned.

It is the object of the present invention to provide a control unit for a road finishing machine which, despite its robust structural design, provides a more precise adjustment of the height of the vertically adjustable beam of the road finishing machine than was heretofore possible.

Figure 2:
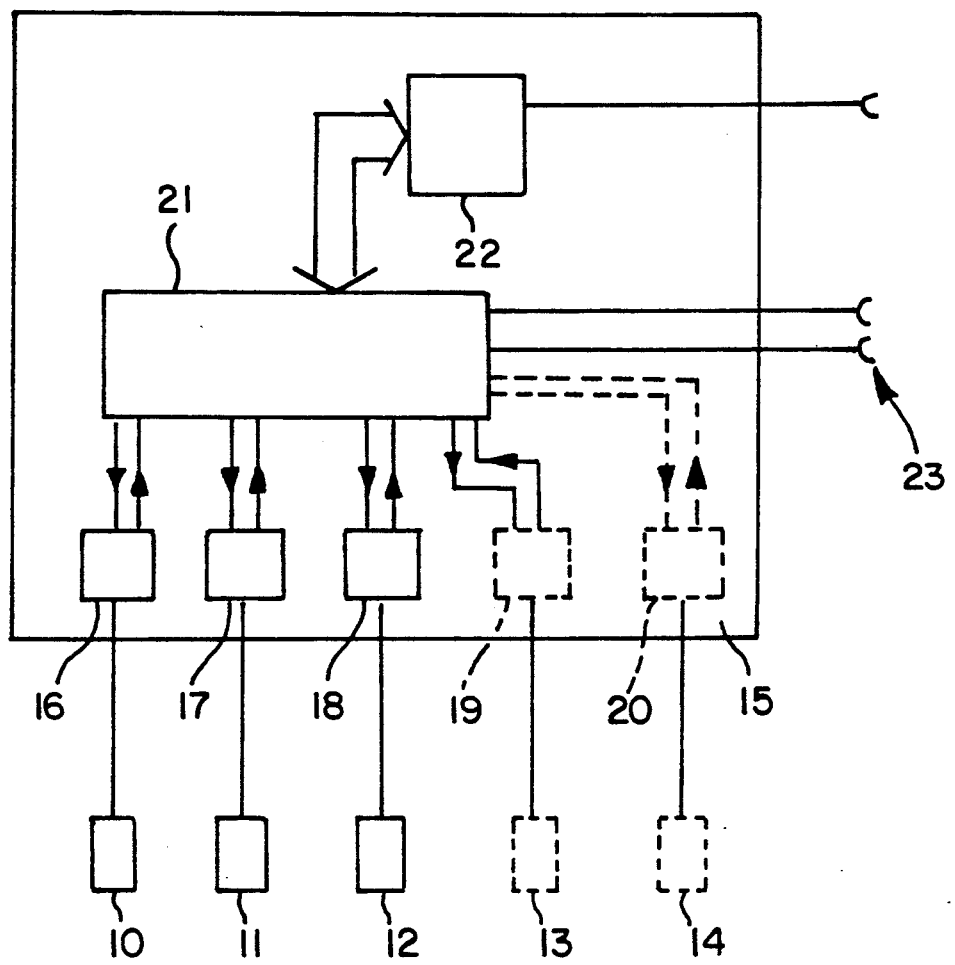

A preferred embodiment of the invented ultrasonic sensor control unit is explained in detail with reference to the appended drawings, in which;

FIG. 1 is a schematic representation of a road finishing machine equipped with an embodiment of the ultrasonic sensor control unit according to the present invention; and FIG. 2 is a block diagram of the ultrasonic sensor control unit according to the present invention.

As can be seen in FIG. 1, a road finishing machine 1, has a track-type travelling gear 2 by means of which the road finishing machine 1 travels on a ground 3 which has been subjected to a preparatory treatment. The end of the road finishing machine which is the rear end, when seen in the direction of motion, has attached thereto a vertically adjustable screed 4, which, by means of a tie arm 5, is articulated on the road finishing machine 1 on a tie point 6. In front of the screed 4 is a supply 7 of the asphalt material, the supply being kept constant essentially over the whole width of the screed by adequately controlling the rotational speed of a worm-type conveyor means 8 in a manner known per se.

The beam 4 floats on the asphalt of the road surfacing to be produced. The thickness which the road surfacing to be produced has prior to its final compacting by road rollers is determined by adjusting the height of the rear edge 9 of the screed 4. This height adjustment is caused by varying the inclination angle of the screed 4, and, typically, it is effected by controlling actuating cylinders, which engage the front ends of the tie arms 5.

The road finishing machine as described above is a commercially available machine.

According to the present invention, a plurality of ultrasonic sensors 10, 11, 12, preferably three ultrasonic sensors are arranged on a respective known level and at known distances (a) from one another on a holding device 5a, which is secured to the tie arm 5. The three ultrasonic sensors 10, 11, 12 are attached to the tie arm 5 of the road finishing machine 1 in such a way that the sound cones of the three ultrasonic sensors 10, 11, 12 impinge vertically downwards, and one after the other essentially in the direction of motion of the road finishing machine 1, onto a reference surface at the side of the track-type travelling gear 2, the reference surface being defined, e.g., by a lane of the road surfacing which has already been prepared or by an old lane of the road surfacing.

In any case, the position of the ultrasonic sensors is so selected that the sensors are spaced apart as far as possible in the direction of motion of the road finishing machine. As explained in detail below, at least three mutually spaced ultrasonic sensors, which are mutually displaced essentially in the direction of motion and the respective sound cones of which are directed essentially downwards, are required to achieve the purpose of the present invention. A higher number of ultrasonic sensors may be employed.

As can be seen in FIG. 2, the three ultrasonic sensors 10, 11, 12, (and, if necessary, additional ultrasonic sensors 13, 14, which are only indicated by a broken line), are connected to an evaluation means 15. The evaluation means 15 comprises a number of transmitting and receiving circuits 16, 17, 18, 19, 20 corresponding to the number of ultrasonic sensors 10, 11, 12, 13, 14. The transmitting and receiving circuits 16 to 20 are connected to a computing unit 21, which can, for example, be a microcomputer. The microcomputer controls the transmitting and receiving circuits 16 to 20 in such a way that the ultrasonic sensors 10 to 14 are, one after the other, cyclically activated for transmitting ultrasonic pulses. Based on the elapsed time between the activation of the ultrasonic sensors and the reception of an ultrasonic pulse reflected by the reference plane, the computing unit 21 determines the distances s1, s2, s3, s4, s5 between the ultrasonic sensors 10, 11, 12, 13, 14 and the respective measuring points on the reference surface.

The evaluation means in the preferred embodiment uses only three ultrasonic sensors 10, 11, 12 so that the control described operates on the basis of the distances s1, S2, s3.

The evaluation means will reject one of these measured distances s1, s2, s3 as faulty measurement, if the measuring point in question lies more than a predetermined distance outside of the plane which is determined by the measuring points associated with the other distances. A possible examination of the measured distances in order to find out whether they are faulty measurements or valid measurements will, by way of example, be explained in detail hereinbelow.

On the basis of the distances which have not been rejected as faulty measurement, the evaluation means 15 projects a resultant height at the rear edge 9 by making use of the individual measured values and mutual distances. In other words, the evaluation means 15 derives a height control signal for the adjustment of the screed 4 from the height of the rear edge 9 of the screed 4 relative to the reference surface, which is calculated by the evaluation means on the basis of the distances s1, s2, s3 and the known geometrical arrangement of the ultrasonic sensors 10, 11, 12 with respect to the rear edge 9 of the screed 4, and from a selectably desired thickness of the road surfacing to be produced. On the basis of the position of the thus calculated reference plane on the rear edge 9 of the screed 4 as well as on the basis of the desired thickness of the road surfacing to be produced, which thickness can be selected freely by the operators, a control signal is generated for controlling the height of the rear edge 9 of the screed 4. This control signal can be supplied, e.g. via a digital-to-analog converter 22 connected downstream of the computing unit 21, to an electro-hydraulic control means which is used for controlling the height of the screed 4 and which is known per se. It is also possible to output the control signal in the form of a digital control signal through a digital output 23. Via a tie point adjustment means, which is known per se, the control signal serves to adjust the height of the tie point 6 of the tie arm 5 on the road finishing machine 1.

In the preferred embodiment of the invention, it will suffice to make use of very simple measures for examining whether the distances measured are faulty distances or valid distances, for calculating the average value on the basis of the valid distances, and for calculating the control signal.

In the preferred embodiment, the ultrasonic sensors 10, 11, 12 are attached to the holding device 5a on one level and at identical distances "a" from one another. In this embodiment, the evaluation means determines the differences d12, d13, d23 between two distances s1 and s2, or s1 and s3, or s2 and s3 in each case. The distances which are classified as valid distances by the evaluation means are those whose difference is smaller than a limit value. If, for example, the third ultrasonic sensor 12 supplies a faulty distance measurement signal s3 because its sound cone impinges on an obstacle, e.g., in the form of a stone lying on the ground, only the difference d12 between the first and second distances s1, s2 will be smaller than a limit value, which defines an admissible waviness of the reference surface. Hence, the first and second distances s1, s2 can be classified as valid distances by the evaluation unit, whereas the third distance s3 will be rejected as faulty measurement.

The invented ultrasonic sensor control unit will, on the one hand, prevent distance measurement signals which lie outside of a "validity window" from exerting a proportionate, distorting influence on the ascertained height of the reference plane. On the other hand, the reference plane can be smoothed by forming an average value so that even a wavy character of the reference plane sampled can be compensated for within certain limits. The ultrasonic sensor control unit works in a noncontacting and, consequently, wear-free mode of operation on the sampling side, and thus is not subject to damage.

What is claimed is:

1. An ultrasonic control unit for a road finishing machine for adjusting the height of a vertically adjustable screed of said machine with regard to a reference surface, comprising:

at least three ultrasonic sensors (10,11,12), each having a associated radiation cone, said ultrasonic sensors (10,11,12) being arranged on a holding device (5a) which is secured to the screed (4), in spaced relationship (a) with one another essentially in the direction of motion of the road finishing machine (1) in such a way that, on the reference surface, a distance exists between the individual radiation cones of said ultrasonic sensors (10, 11, 12), an evaluation means (15) for detecting the distances (s1, s2, s3) between each ultrasonic sensor (10, 11, 12) and the reference surface on the basis of the ultrasonic sensor signals, said evaluation means (15) being adapted to reject one of the measured distances (s1, s2, s3) as faulty measurement, if the measuring point in question lies more than a predetermined distance outside of the plane which is determined by the measuring points associated with the other distances; and means (15) being adapted for calculating the height of the read edge (9) of the screed relative to the reference surface on the basis of the distances (s1,s2,s3) which have not been rejected as faulty measurements and the known geometrical arrangement of the ultrasonic sensors (10, 11, 12) with respect to said rear edge (9) of the screed (4).

2. An ultrasonic sensor control unit according to claim 1, wherein said screed is attached to a tie bar, said tie bar having a tie point, said tie bar being adapted to freely articulate about said tie point, and said calculating means (15) being adapted to generate a height control signal for adjusting said tie point of said tie arm (5) relative to said road finishing machine.

3. An ultrasonic sensor control unit according to claim 1, wherein the calculation means (15) is adapted to derive form said height and from a selectable desired thickness of the road surfacing to be produced a height control signal for adjusting said screed (4).

4. An ultrasonic control unit for a road finishing machine for adjusting the height of a vertically adjustable screed of said machine with regard to a reference surface, comprising:

at least three ultrasonic sensors (10,11,12), each having a associated radiation cone, said ultrasonic sensors (10,11,12) being arranged on a holding device (5a) which is secured to the screed (4), in spaced relationship (a) with one another essentially in the direction of motion of the road finishing machine (1) in such a way that, on the reference surface, a distance exists between the individual radiation cones of said ultrasonic sensors (10, 11, 12), said ultrasonic sensors (10, 11, 12) being attached to said holding device (5a) on a respective known level and at known distances from one another an evaluation means (15) for detecting the distances (s1, s2, s3) between each ultrasonic sensor (10, 11, 12) and the reference surface on the basis of the ultrasonic sensor signals, said evaluation means (15) being adapted to determine the differences (d12, d13, d14) between respective two distances (s1, s2; s1, s3; s2, s3), and to classify the distances whose difference is smaller than a limit value as valid distances, and means (15) adapted for calculating the height of the rear edge (9) of the screed (4) relative to the reference surface on the basis of the valid distance (s1, s2, s3) and the known geometrical arrangement of the ultrasonic sensors (10, 11, 12) with respect to said rear edge (9) of the screed (4).

5. An ultrasonic sensor control unit according to claim 4, wherein the calculating means (15) is adapted to derive from said height and from a selectable desired thickness of the road surfacing to be produced a height control signal for adjusting said screed (4).

6. An ultrasonic sensor control unit according to claim 4, wherein said screed is attached to a tie bar, said tie bar having a tie point, said tie bar being adapted to freely articulate about said tie point, and said calculating means (15) being adapted to generate a height control signal for adjusting said tie point of said tie arm (5) relative to said road finishing machine.

* * * * *